United States Patent Office 3,081,264

Patented Mar. 12, 1963

3,081,264

METHOD OF PREPARING A MAGNETIC RECORDER POWDER

Soichiro Nobuoka, Nara City, Tokuo Ando, Sakai City, and Fumitada Hayama, Osaka, Japan, assignors to Matake Kurokawa, Chief of the Agency of Industrial Science and Technology, Tokyo, Japan No Drawing. Filed Mar. 30, 1959, Ser. No. 802,614
Claims priority, application Japan Apr. 9, 1958
3 Claims. (Cl. 252—62.5)

The present invention relates to improved powders for magnetic recording purposes, and to methods for their preparation.

The invention is particularly directed to the production of powders suitable for the manufacture of sound and video recording tapes, the powder consisting of fine crystals of an intimate mixture of cobalt oxide and an iron oxide.

Mixtures of cobalt oxide and iron oxide have previously been employed for magnetic purposes, but such combinations have not been suitable for use as magnetic recording powders. Such mixtures have been prepared by combining the cobalt oxide with an iron oxide and oxidizing and sintering the mixture at high temperatures on the order of 1000° C. or more. The compositions which result from this type of process have pronounced magnetic properties making them suitable for use in transformer cores, and the like, but these same magnetic properties are not the type desired for a high quality magnetic recording medium. Furthermore, the particles obtained by this type of process are too coarse, and are not uniform, two additional factors which make them unsuited for application to a tape or other magnetic recording medium.

Accordingly, an object of the present invention is to provide a method for producing improved magnetic recording powders from cobalt and iron in a form in which this combination has improved magnetic recording properties.

A further object of the invention is to provide a method for the production of fine grained crystals containing cobalt oxide and iron oxide of uniformly small particle size.

A further object of the invention is to provide an improved magnetic recording powder suitable for the production of magnetic recording tapes and the like having a high coercive force.

In the method of the present invention, improved magnetic recording powders are prepared by a process of coprecipitation of cobalt and iron hydroxides from an alkaline solution of a ferric salt and a divalent cobalt salt. The gel precipitate which results is then heated in the presence of the mother liquor until the original gel precipitate turns into a fine grained crystalline precipitate. After the precipitate is rinsed and dried, it is heated in a reducing atmosphere. Following the reduction step, the material may be reoxidized at elevated temperatures to improve some of the magnetic properties.

The conversion of the gel precipitate to the finely divided crystalline form is preferably carried out under heat and pressure in an autoclave. Alternatively, the precipitate and the mother liquor may be boiled at atmospheric pressure until the crystalline precipitate results, but this procedure takes considerably longer than the treatment in an autoclave.

The magnetic materials produced according to the present invention have high coercive force values which may range from about 250–600 oersteds, or more. Recording tapes coated with the improved powders evidence little tendency toward self-demagnetization, exhibit excellent high frequency response, and good sensitivity. The curves of magnetic field strength versus residual induction of these materials begin to rise rapidly above 200 oersteds and the slope of the curve is quite steep. This property contributes to minimize transfer, and to improve the reproducing response of the magnetic tapes.

From experiment, it has been found that the most suitable products for recording tapes are prepared when the fine grain precipitates are prepared at temperatures of 130–170° C., and where the mol ratio of cobalt oxide in the product is in the range of about 0.2 to 3%. The X-ray analysis of the product indicates that the crystals have a spinel type structure, and include no free cobalt oxides. The particle size of the fine crystals is in the submicron range, and generally has an average size of 0.5 micron or less.

In carrying out the process, we have found that best results are obtained by operating within the following ranges:

Transformation of co-precipitated hydroxides to finely divided crystals:
  At least 100° C. and preferably 130–170° C.
Temperature of reduction:
  350 to 400° C.
Temperature of reoxidation:
  200 to 550° C.
Mol ratio of cobalt oxide to ferric oxide:
  Not more than 1–1, and preferably from 0.2 to 3%.

The following specific examples illustrate several methods for preparation of the improved materials:

EXAMPLE I $FeCl_3.6H_2O$ in an amount of 53.52 grams and 0.291 grams of cobaltous nitrate ($Co(NO_3)_2.6H_2O$) were dissolved together in one liter of water. A second solution was made up consisting of 30 grams of sodium hydroxide in one liter of water. The two solutions were maintained at temperatures of 30° C., and mixed with agitation. The iron and cobalt hydroxides were precipitated simultaneously. The precipitate was maintained at 30° C., and after standing for 24 hours, the precipitate with the mother liquor were transferred to an autoclave and heated for 30 minutes at 140° C. under pressure. By this treatment, the colloidal precipitate was converted into a crystalline precipitate. After washing and drying, the precipitate was transferred to a rotary furnace and heated at 350° C. for one hour in a reducing atmosphere which may be hydrogen, carbon monoxide, or city gas. After heating, the product was cooled to room temperature in the same atmosphere. This reduction treatment was followed by heating the product at 220° C. for 30 minutes in air.

EXAMPLE II

Ferric chloride in an amount of 53.956 grams and 0.058 gram of cobaltous nitrate were dissolved together in one liter of water. Thirty grams of sodium hydroxide were dissolved in one liter of water, and the two solutions mixed to produce the coprecipitate as in Example I. The precipitate was heated at 150° C. for 30 minutes in an autoclave. The crystals which resulted were reduced and oxidized under the same conditions as given in Example I.

The magnetic properties of the products produced by the above methods were measured by a magnetometer at a maximum applied field strength of 1500 oersteds. The powder was packed in a glass tube of 8 millimeters inner diameter and a length of 80 millimeters.

The following tables illustrate the effect of the cobalt content upon the magnetic properties of the crystals, and also the effect of temperature in the step of converting the gel precipitate to the crystalline precipitate.

*Table 1*

INFLUENCE OF COBALT CONTENT

| CoO/Fe2O3 (mol ratio) | Coercive force, $H_c$ (oersteds) | Residual induction, $B_r$/Maximum residual induction, $B_m$ |
|---|---|---|
| 0/100.0 | 250 | 0.49 |
| 0.2/99.8 | 272 | 0.50 |
| 0.4/99.6 | 280 | 0.50 |
| 1.0/99.0 | 280 | 0.50 |
| 2.0/98.0 | 340 | 0.50 |
| 4.0/96.0 | 408 | |
| 8.0/92.0 | 544 | |
| 15.0/85.0 | 612 | |
| 30.0/70.0 | 532 | |
| 50.0/50.0 | 500 | |

*Table 2*

INFLUENCE OF TEMPERATURE

| CoO/Fe2O3 (mol ratio) | Temperature, ° C. | Coercive force, $H_c$ (oersteds) | $B_r/B_m$ | Remarks |
|---|---|---|---|---|
| 1.0/99.0 | 130 | 358 | 0.53 | |
| 1.0/99.0 | 140 | 369 | 0.53 | Ex. 1. |
| 1.0/99.0 | 150 | 334 | 0.52 | |
| 1.0/99.0 | 160 | 327 | 0.50 | |
| 1.0/99.0 | 170 | 317 | 0.50 | |
| 1.0/99.0 | 180 | 280 | 0.50 | |
| 1.0/99.0 | 190 | 271 | 0.50 | |
| 1.0/99.0 | 200 | 264 | 0.50 | |
| 0.2/99.8 | 130 | 295 | 0.51 | |
| 0.2/99.8 | 140 | 389 | 0.52 | |
| 0.2/99.8 | 150 | 360 | 0.52 | Ex. 2. |
| 0.2/99.8 | 160 | 304 | 0.51 | |

We claim as our invention:

1. The method of preparing a magnetic recording powder which comprises co-precipitating cobalt and iron hydroxides from an alkaline medium, the mol ratio of cobalt to iron, expressed as CoO to $Fe_2O_3$ being at least 0.2% but not more than 1 to 1, heating the resulting precipitate with the mother liquor under pressure at a temperature from 130 to 170° C. to produce a crystalline precipitate, and then reducing the resulting crystals in a reducing atmosphere at a temperature from 350 to 400° C.

2. The method of preparing a magnetic recording powder which comprises co-precipitating cobalt and iron hydroxides from an alkaline medium, the mol ratio of cobalt to iron expressed as CoO to $Fe_2O_3$ being in the range from 0.2 to 3%, heating the resulting precipitate with the mother liquor under pressure at a temperature from 130 to 170° C. to produce a crystalline precipitate, and then reducing the resulting crystals in a reducing atmosphere at a temperature from 350 to 400° C.

3. The method of claim 2 in which the reduced crystals are reoxidized in an oxidizing atmosphere at a temperature from 200 to 550° C.

References Cited in the file of this patent

UNITED STATES PATENTS

| | | |
|---|---|---|
| 1,997,193 | Kato et al. | Apr. 9, 1935 |
| 2,463,413 | Neel | Mar. 1, 1949 |
| 2,694,656 | Camras | Nov. 16, 1954 |
| 2,734,033 | Menard | Feb. 7, 1956 |
| 2,770,523 | Toole | Nov. 13, 1956 |
| 2,929,787 | Eckert | Mar. 22, 1960 |

FOREIGN PATENTS

| | | |
|---|---|---|
| 1,154,191 | France | Oct. 28, 1957 |
| 130,815 | Australia | Jan. 10, 1949 |
| 717,269 | Great Britain | Oct. 27, 1954 |
| 721,630 | Great Britain | Jan. 12, 1955 |
| 739,069 | Great Britain | Oct. 26, 1955 |
| 752,156 | Great Britain | July 4, 1956 |

OTHER REFERENCES

J. Institute of Electrical Engineers, Japan, October 1939, p. 277.